United States Patent
Cyr et al.

(10) Patent No.: US 7,315,555 B2
(45) Date of Patent: Jan. 1, 2008

(54) SUB-NETWORK AND RELATED METHODS FOR ROUTING SIGNALING MESSAGES

(75) Inventors: Bernard Louis Cyr, Aurora, IL (US); Mitchell R. Gerdisch, Naperville, IL (US); Tengywe E. Hong, Naperville, IL (US); Leonardo Silvestri, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1095 days.

(21) Appl. No.: 10/161,532

(22) Filed: Jun. 3, 2002

(65) Prior Publication Data

US 2003/0223457 A1 Dec. 4, 2003

(51) Int. Cl.
*H04J 3/24* (2006.01)
*H04J 3/00* (2006.01)

(52) U.S. Cl. ........................................ 370/474; 370/476
(58) Field of Classification Search ...................... None
See application file for complete search history.

(56) References Cited

U.S. PATENT DOCUMENTS

| | | | |
|---|---|---|---|
| 6,353,607 B1 * | 3/2002 | Valentine et al. | 370/349 |
| 6,564,059 B1 * | 5/2003 | Cyr et al. | 455/445 |
| 6,697,355 B1 * | 2/2004 | Lim | 370/352 |
| 6,952,428 B1 * | 10/2005 | Necka et al. | 370/466 |
| 6,967,956 B1 * | 11/2005 | Tinsley et al. | 370/466 |
| 2002/0062450 A1 * | 5/2002 | Carlson et al. | 713/200 |
| 2002/0064141 A1 * | 5/2002 | Sakakura | 370/331 |
| 2002/0080791 A1 * | 6/2002 | Sylvain | 370/394 |
| 2004/0213206 A1 * | 10/2004 | McCormack et al. | 370/352 |

OTHER PUBLICATIONS

Mogul et al., Internet Standard Subnetting Procedure, RFC 950, Aug. 1985.

* cited by examiner

*Primary Examiner*—Edan Orgad
*Assistant Examiner*—Blanche Wong

(57) ABSTRACT

An IP sub-network includes a gateway and a plurality of sub-network processors in communication with the gateway. An IP address is associated with each sub-network processor, the IP address having a sub-network address portion corresponding to the sub-network and a host address portion corresponding to the sub-network processor. Each sub-network processor generates a transaction identifier for each signaling message that is communicated by the gateway to the signaling network. The transaction identifier is based on the IP address and can be generated by separating the sub-network address portion of the IP address and concatenating the host address portion with a numerical value, which corresponds to a predetermined, non-random ordering scheme. A signaling message can be routed to a sub-network processor by concatenating the sub-network address portion with the host address portion used as part of the transaction identifier.

14 Claims, 6 Drawing Sheets

SUB-NETWORK AND RELATED METHODS FOR ROUTING SIGNALING MESSAGES

FIELD OF THE INVENTION

The present invention relates to the field of telecommunications and, more particularly, to communications between signaling networks and sub-networks.

BACKGROUND OF THE INVENTION

A telecommunications system establishes a communication path that allows information to be exchanged between parties at locations remote from one another. Modern telecommunications systems provide for more than voice-to-voice communication, encompassing electronic mail exchanges, data file transfers, and a host of other communication modes. As modern telecommunications systems continue to evolve, there is a move away from traditional circuit-switched networks toward internet protocol (IP) networks.

Telecommunication over an IP network can be accomplished using a conventional telephone, a computer, or other type of processor. Depending on the service provider, the caller may have to dial in a special code as a way of routing the call to the service provider. Initially, the call is carried just as any other over a Public Switched Telephone Network (PSTN). The call, however, is then sent to an IP gateway, typically a server and server software that may be maintained by a local service provider.

The gateway converts the call into digital data and compresses the data so that the resulting data files can be carried rapidly to a second IP gateway nearest to the destination of the call. The second gateway takes the packets, decompresses them, converts them to their original analog form and sends them through the PSTN. Other forms of data, besides voice data, can similarly be communicated between gateways. The result has been a convergence of traditional telecommunication networks and traditional data networks.

Multiple processors can be connected to a common gateway to form an IP sub-network, with each processor having an IP address. U.S. Pat. No. 6,249,820 B1 to Dobbins et al., for example, discloses a method of IP addressing in which multiple processors (hosts) are grouped by a common address associated with a router. Accordingly, the IP address of each processor or host can include a sub-network portion associated with the particular sub-network and a portion identifying each particular processor connected to the same gateway.

Each of the processors that are part of a distinct IP sub-network can communicate with entities outside the IP sub-network through the gateway, which connects to other networks. These communications can be controlled with the use of a common channel signaling system, such as the SS7 system based on a protocol established by the International Telecommunications Union's Telecommunications Standardization Sector (ITU-T).

In general a common channel signaling system is a signaling system in which a traffic line and signaling line are managed separately to transmit a signal for a call through the signaling line. With such a system signaling messages are used for call set-up, teardown, and routing, as well as for the exchange of information regarding caller identification (e.g., identifying a mobile phone by its serial number) and for service billing.

These signaling messages (i.e., signaling traffic) can be routed over the IP sub-network. More specifically, a signaling message can be routed on the basis of a sub-network processor's IP address. Published U.S. Patent Application 2001/0055380 A1 to Benedyk et al., for example, discloses a method of routing signaling messages in a converged telephony-data network based upon registration of routing keys. The routing key can be an originating point code, destination point code, or similar type of identifier that is registered with a gateway. Conventional systems also rely on storing point code in a database or look-up table for routing signaling messages among processors over the IP sub-network.

With conventional systems, therefore, a gateway serving multiple processors must be configured to associate a point code with an IP address to route SS7 or other signaling messages over the subnetwork. Among the problems with such routing is that each signaling message must include additional, complex 5 addressing layers to accommodate at least one point code corresponding to a signaling message and processor.

An even more burdensome problem is that the gateway device typically includes a large, complex look-up table to record and relate each point code or identifier with the corresponding signaling message and processor. Such a look-up table is not only cumbersome to construct, but must be maintained with at least some level of fault resiliency. Routing signaling messages, moreover, is accordingly more complex. Routing requires that the gateway record the point code for an outgoing or initial message. When a response message is received, the gateway must search the look-up table to find the corresponding point code before it can route the response message to the correct processor.

SUMMARY OF THE INVENTION

In view of the foregoing background, it is therefore an object of the present invention to provide for the more efficient routing of signaling messages between a signaling network and an IP sub-network.

This and other objects, features, and advantages in accordance with the present invention are provided by a sub-network and related methods that route signaling messages between the sub-network and a signaling network by generating for each signaling message a transaction identifier based on an IP address. The sub-network may include a plurality of sub-network processors connected to a gateway for communicating with the signaling network. Each sub-network processor may have an IP address that is used by the sub-network processor in generating the transaction identifier based on the IP address of the sub-network processor.

The IP address may include a sub-network address portion and a host address portion. The sub-network address portion may correspond to the sub-network comprising the plurality of sub-network processors connected to the common gateway. The host address portion of the IP address may correspond to the particular sub-network processor generating the transaction identifier associated with a particular signaling message.

In addition, the transaction identifier may further comprise a numerical value corresponding to a predetermined ordering scheme. For example, the numerical value may correspond to the sequential ordering of transaction identifiers generated by a sub-network processor.

In generating a transaction identifier for a signaling message, a sub-network processor may separate the sub-network address portion and the host address portion. Upon separation of the two address portions, the sub-network processor may use only the host address portion in generating the transaction identifier. The numerical value may be concatenated with the host address portion of the IP address to generate the transaction identifier.

For example, the IP address may be a bit-string of binary digits, a first group comprising the sub-network address portion and a second group comprising the host address portion. Accordingly, in generating a transaction identifier for a signaling message, a sub-network processor may delete the first group of binary digits, using only the remaining second group (i.e., host address portion) in generating the transaction identifier. With the first group of binary digits in the bit-string deleted, additional bits may be added after the host address portion, these trailing bits corresponding to the predetermined order scheme.

Frequently, a series of signaling messages will comprise a single transaction. The transaction may include at least an initial signaling message and a response thereto. The initial message may be generated by a sub-network processor, which may also generate a corresponding transaction identifier. The initial message may be conveyed via the gateway to the signaling network. The message may be conveyed without assigning a point code or recording the transaction identifier in a look-up table.

A response signaling message responding to the initial signaling message may then be received from the signaling network and routed by the gateway to the sub-network processor that generated the initial message, the routing being based on the transaction identifier. Because the gateway and the sub-network processor are on the same sub-network, the gateway knows the sub-network portion of the sub-network processor's IP address. The gateway may concatenate the sub-network address portion and the host address portion embedded in the transaction identifier. The message thus may be routed over the IP sub-network without the use of point code or a look-up table.

A further aspect of the invention pertains to a method of communicating signal messages between a signaling network and a plurality of sub-network processors connected to the signaling network via a gateway and having an IP address. According to the invention, the signaling messages may be communicated by generating a transaction identifier for each signaling message whereby the transaction identifier is based on the IP address of the sub-network address generating the transaction identifier.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
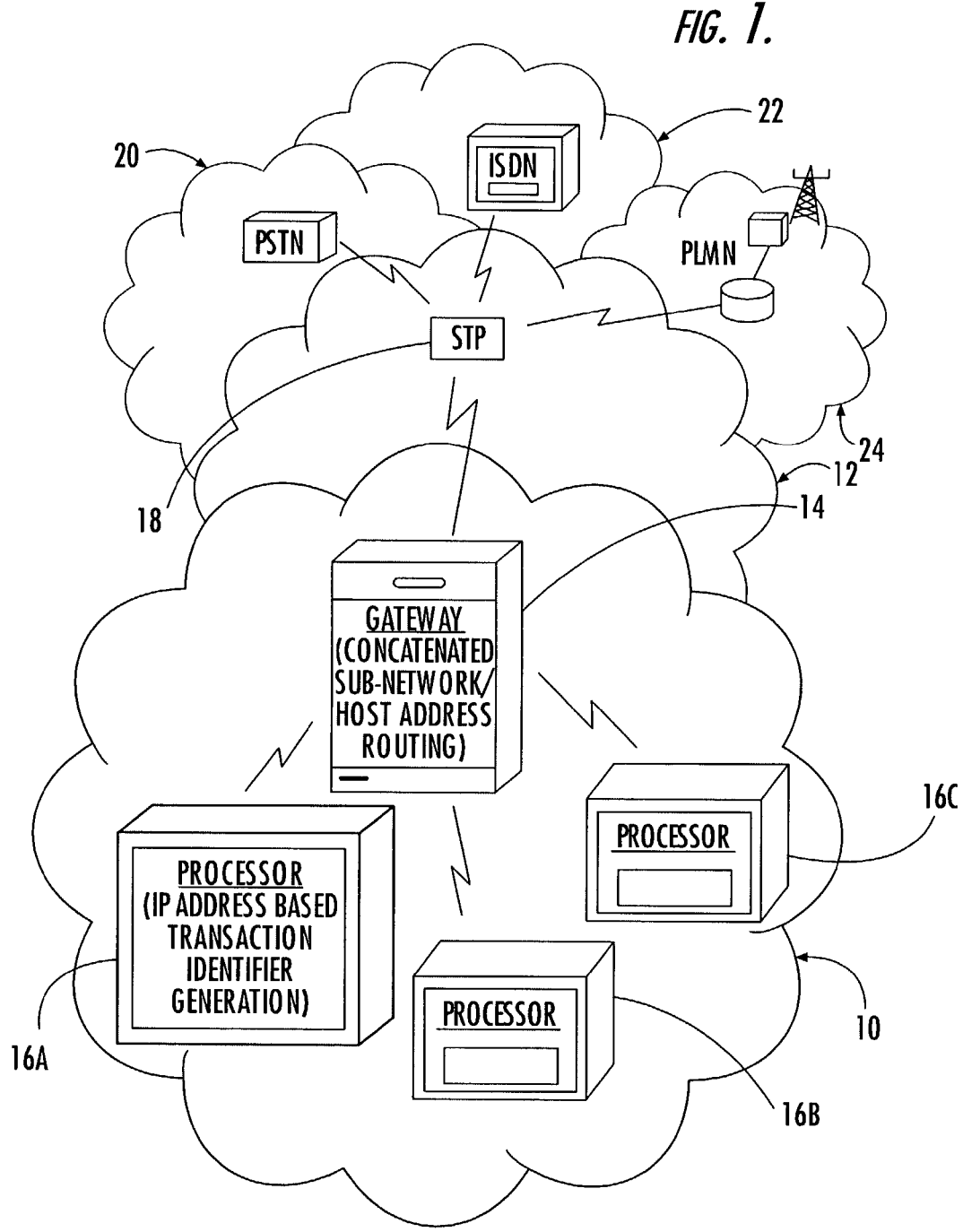
FIG. 1 is a schematic diagram of a sub-network according to the invention.

Referring initially to FIG. 1, a sub-network 10 for connection to a signaling network 12 and for communication therewith in accordance with the invention is described. The sub-network 10 comprises a gateway 14 and a plurality of sub-network processors 16A-16C, each sub-network processor connected in communication with the gateway and having its own IP address. The gateway 14 communicates signaling messages from each of the sub-network processors 16 to the signaling network 12.

The signaling network 12 includes at least one signal transfer point (STP) or switching node 18 able to handle communication traffic between the sub-network processors 16 and other communication devices or nodes that are part of other networks linked to the signaling network. These other networks illustratively include a public switched telephone network (PSTN) 20, integrated service digital network (ISDN) 22, and public land mobile network (PLMN) 24. Other networks can include virtual private networks (VPNs) and intelligent networks (IN), not shown, which will be familiar to those skilled in the art.

Figure 2:
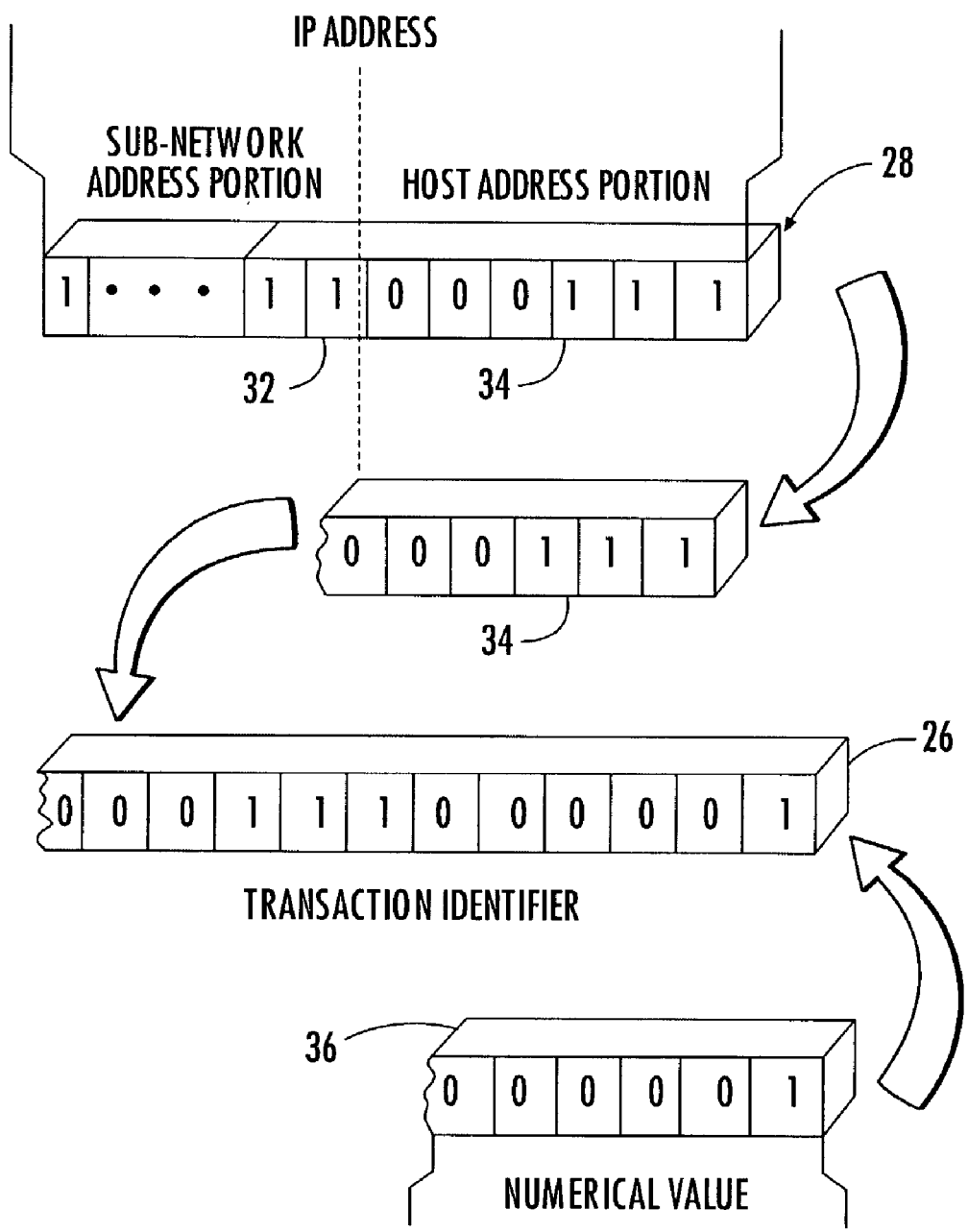
FIG. 2 is a schematic diagram of a bit-string representing a transaction identifier generated for a signaling message associated with the sub-network of FIG. 1.
Figure 3:
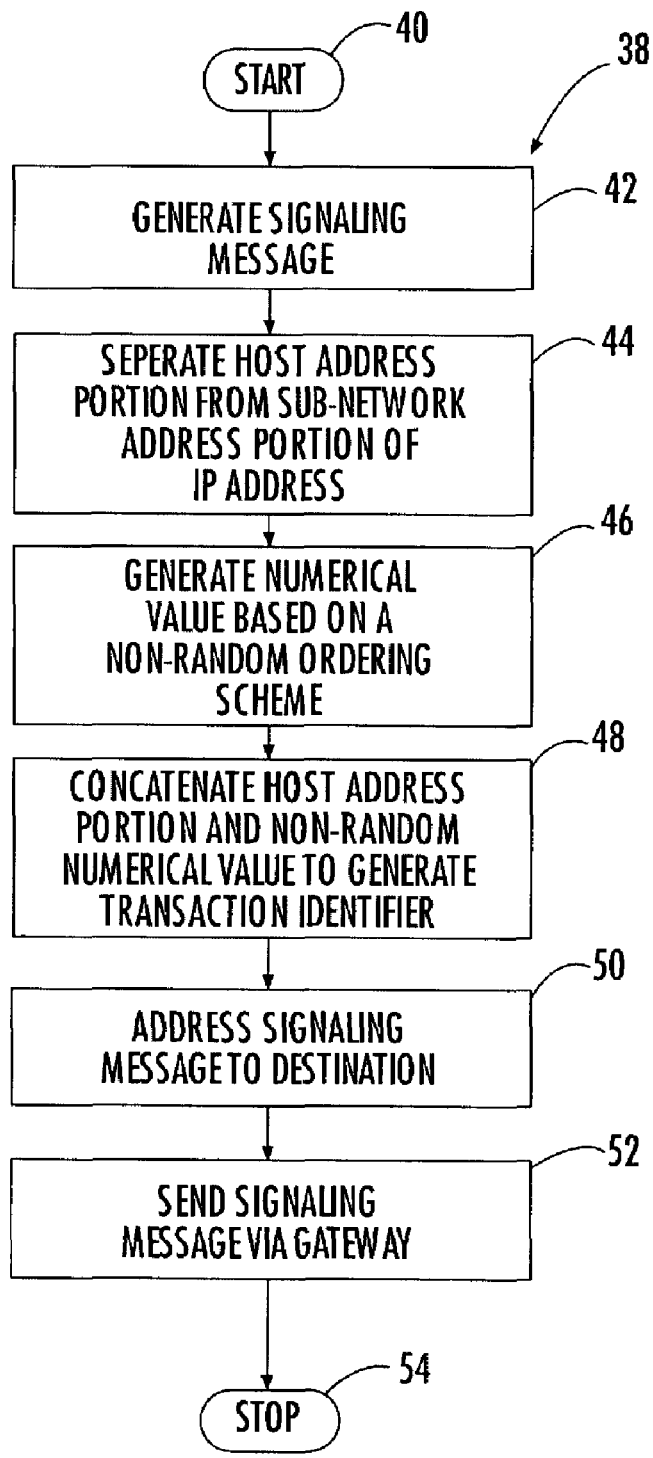
FIG. 3 is a flow chart of a method of generating a transaction identifier for a signaling message according to the invention.

Referring now to FIGS. 2 and 3, each sub-network processor 16 generates a respective transaction identifier 26 for each signaling message. The transaction identifier 26 is based on the IP address 28 of the sub-network processor 16 that generates the transaction identifier. The IP address 28 illustratively comprises a sub-network address portion 32 and a host address portion 34. The sub-network address portion 32 corresponds to the plurality of sub-network processors 16 that along with the gateway 14 comprise the sub-network 10. The host address portion 34 corresponds to the sub-network processor generating the transaction identifier 28.

Each of the processors 16A-16C generates a transaction identifier corresponding to each signaling transaction initiated by an initial signaling message generated by a processor. Accordingly, the following description of the generation of a transaction identifier 26 generated by one processor 16A applies equally with respect to each of the other processors 16B, 16C of the sub-network 10.

The processor 16A generates a transaction identifier 26 for a signaling message by separating the host address portion 34 from the other IP address portions (illustratively, the sub-network address portion 32) of the IP address 28 of the processor 16A. The processor 16A uses only the host address portion 34 of the IP address 28 in generating the transaction identifier.

The transaction identifier also includes a numerical value 36 generated on the basis of a nonrandom ordering scheme. Illustratively, the numerical value corresponds to a sequential ordering of signaling messages generated by the sub-network processor 16A. As will be readily appreciated by one skilled in the art, however, the numerical value can be based on other non-random schemes.

The transaction identifier 26 and IP address 28 from which it is derived illustratively comprise bit-strings of binary digits. Other numerical or symbolic representations can be used in representing addresses and transaction identifiers, as will also be readily appreciated by one skilled in the art.

The processor 16A generates a respective transaction identifier 26 for a signaling message according to the sequence illustrated in flow chart 38. After the start (Block 40), a signaling message is generated (Block 42). At Block 44, the processor 16 separates the host address portion 34 from the sub-network address portion 32 of the IP address 28. The processor 16A, at Block 46, generates the numerical value 36 based on the non-random ordering scheme.

The numerical value 36 is illustratively generated at Block 46 after the processor 16 has separated the host address portion 34 from the rest of the bit-string comprising the IP address 28 at Block 44. As will be readily appreciated by one skilled in the art, however, the numerical value alternately may be generated before the host address portion 34 is separated from the other portions of the IP address 28. Moreover, the numerical value 36 might alternately be generated concurrently with the separation of the host address portion 34 from the rest of the IP address 28, as will also be readily apparent to one skilled in the art At Block 48, the processor 16 creates the respective transaction identifier 26 by concatenating the stripped out host address portion 34 of the IP address with the numerical value 36. The message is addressed to its destination (Block 50) and sent via the gateway 14 to the signaling network 12 (Block 52).

It is frequently the case that a signaling message is one of a series of signaling messages that jointly comprise a transaction. Specifically, a signaling message may be an initial message in the transaction, which occurs in support of any of number of functions performed by signaling messaging. For example, the transaction may be related to call set-up or tear down. The transaction, alternately, may pertain to call tracking or billing. Still further it may be used for identification verification, such as verifying the serial number of a mobile phone.

Whatever the purpose, a significant advantage of the processor 16A generating the transaction identifier 26 according to the steps outlined above is that no point code needs to be associated with the corresponding signaling message as is conventionally done. Accordingly, in contrast to conventional devices and methods, the sub-network 10 also does not need to maintain a look-up table for recording point code associated with each signaling message. This is because, the gateway 14 is able to route a signaling message received in response to one generated by a sub-network processor 16 based only on the transaction identifier 26 without any point code designation and without needing to reference the point code in a lookup table.

Figure 4:
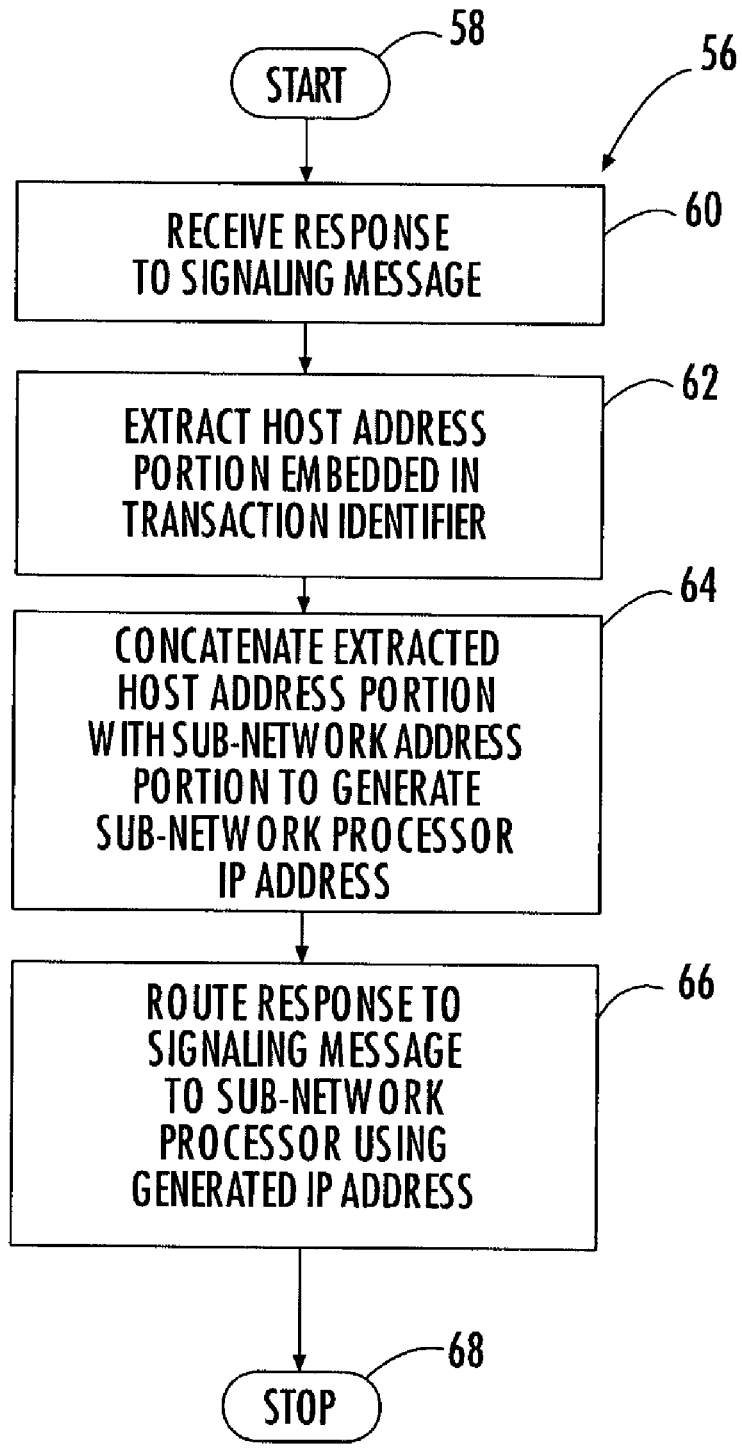
FIG. 4 is a flow chart of a method of routing a signaling message according to the invention.
Figure 5:
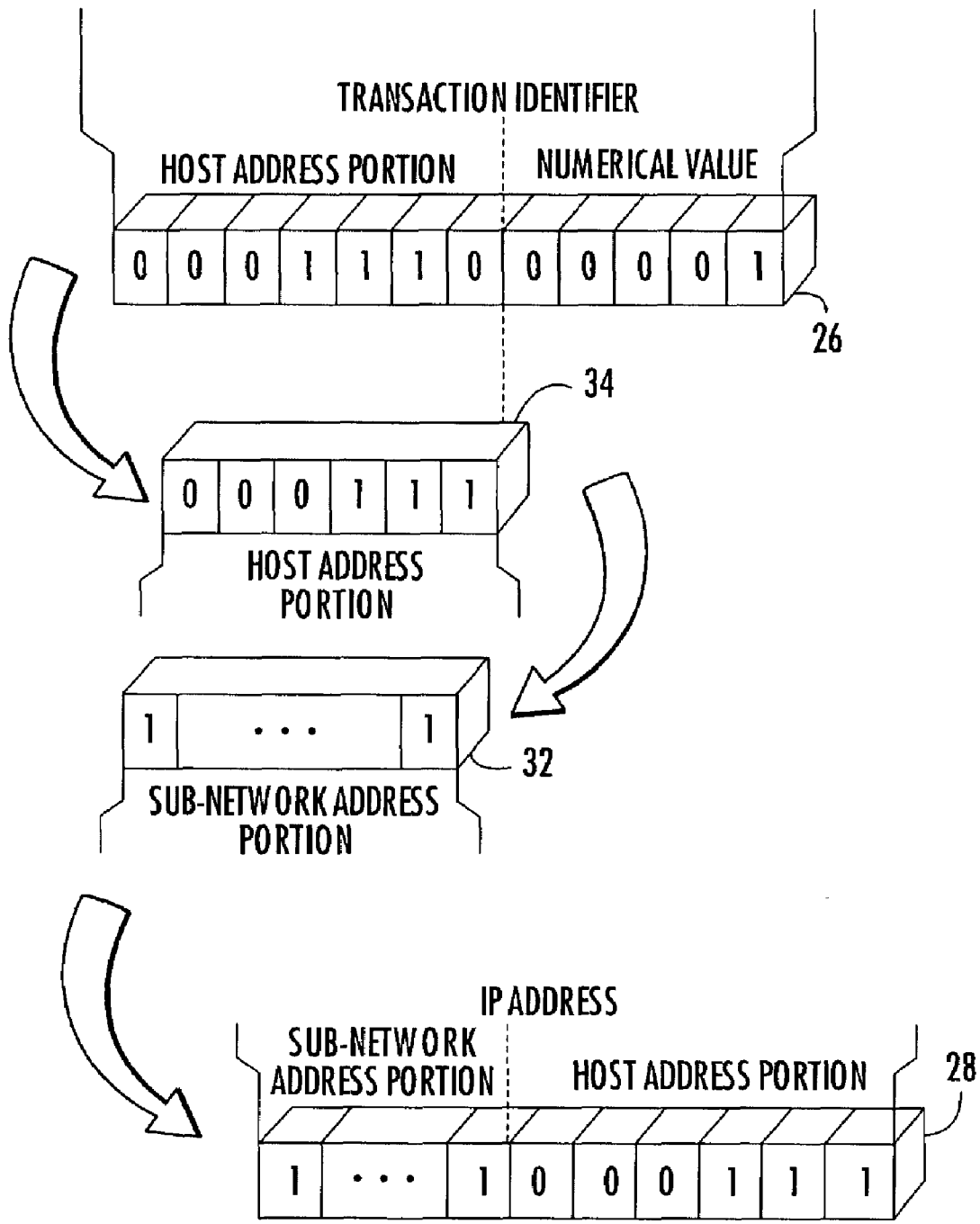
FIG. 5 is a schematic diagram of a bit-string generated in routing a signaling message according to the method of FIG. 4.

Referring now specifically to FIGS. 4 and 5, the gateway 14 is able to route the response message based only on the transaction identifier 26 according to the steps illustrated by the flow chart 56. After the start (Block 58), a response message is received (Block 60). The gateway 14, which has the function of routing the message to the appropriate one of the plurality of sub-network processors 16A-1, at Block 62 extracts from the transaction identifier 26 the host address portion 34 embedded therein. The gateway 14 at Block 64 concatenates the host address portion extracted from the transaction identifier 26 with a sub-network address portion 32. Because the gateway 14 is part of the sub-network 10, the gateway already knows the sub-network address and, as will be readily understood by those skilled in the art, the correct sub-network mask to use for routing the message.

As a result of the extraction and concatenation at Blocks 62 and 64, respectively, the gateway 14 generates the correct IP address 28 for routing the response message to the sub-network processor that generated the signaling message to which the response message is responding. Accordingly, a correct routing address (i.e., IP address) is obtained that is not based on a point code and without the gateway 14 having to resort to a look-up table having point code stored therein.

Figure 6:
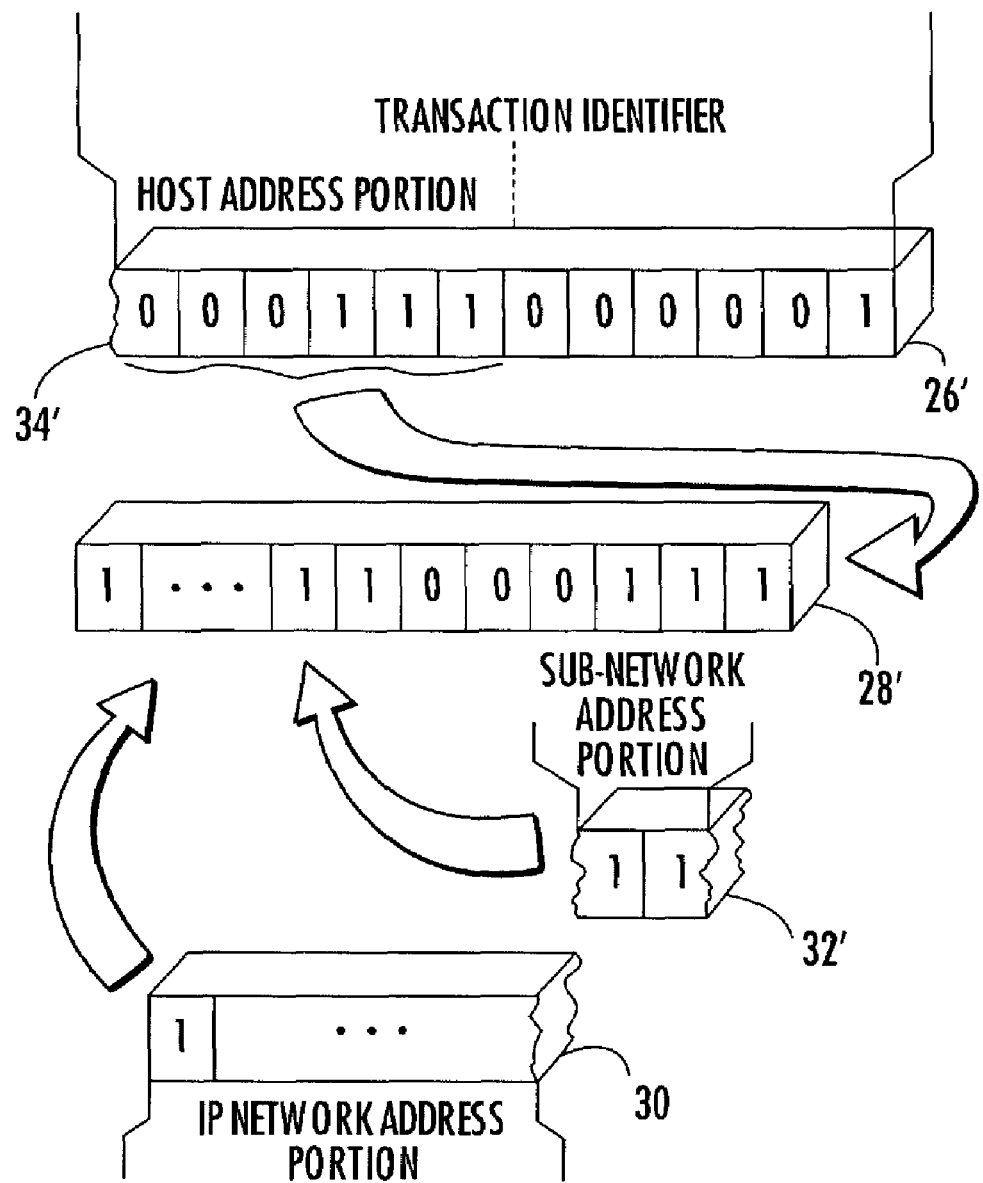
FIG. 6 is a schematic diagram of a bit-string generated in routing a signaling message according to an alternative embodiment of the invention.

Referring now to FIG. 6, an additional embodiment is described wherein the IP address 28' includes an IP network address portion 30 as well as a sub-network address portion 32' and host address portion 34'. The transaction identifier 26' is obtained as described above by extracting the host address portion 34' from the remainder of the IP address 28'. Accordingly in routing a response message based on the transaction identifier 26', the host address portion 34' embedded therein is extracted and concatenated with IP network address portion 30 as well as the sub-network address portion 32'. Based on the IP address 28' so obtained, the gateway 14 is able to route the response message to the correct processor 1 in the sub-network 10 as already described. Again, the gateway 14 is able to route the message without having to rely on point code or referencing a look-up table.

Yet a further aspect of the invention is a method of routing signaling messages between a signaling network 12 and a plurality of sub-network processors 16A-16C, each sub-network processor connected to the signaling network via a gateway 14 and having an IP address. According to the method, a transaction identifier is generated for each signaling message generated by a processor 16A-16C, whereby the transaction identifier is based on the IP address of the sub-network processor generating the transaction identifier.

A transaction identifier 26 is generated by a processor 16A by separating the host address portion 34 from the remaining portions of the processor's IP address 28 and concatenating with the host address portion a non-random numerical value 36. Signaling messages corresponding to the transaction identifier 26 are routed to the sub-network processor 16A by concatenating the sub-network address portion 34 with the transaction identifier 26. Alternately, signaling messages are routed by concatenating with the transaction identifier 26 the network address portion 30 as well as the sub-network address portion 32.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A sub-network comprising:
   at least one sub-network processor for generating signaling messages, said at least one sub-network processor having associated therewith an internet protocol (IP) address and generating a respective transaction identifier based on the IP address for each signaling message:
   the IP address comprising a sub-network address portion corresponding to said at least one sub-network processor and a host address portion corresponding to the sub-network processor generating the transaction identifier.

2. A sub-network according to claim 1 further comprising a gateway communicating the signaling message to a signaling network.

3. A sub-network comprising:
   at least one sub-network processor for generating signaling messages, said at least one sub-network processor having associated therewith an internet protocol (IP) address and generating a respective transaction identifier based on the IP address for each signaling message, wherein the IP address comprises a sub-network address portion and a host address portion, and wherein each sub-network processor generates the transaction identifier for each signaling message by separating the sub-network address portion and the host address portion and using only the host address portion.

4. A sub-network comprising:
   at least one sub-network processor for generating signaling messages, said at least one sub-network processor having associated therewith an internet protocol (IP) address and generating a respective transaction identifier based on the IP address for each signaling message, wherein the transaction identifier includes a non-random numerical value generated by the sub-network processor.

5. A sub-network comprising:
   at least one sub-network processor for generating signaling messages, said at least one sub-network processor having associated therewith an internet protocol (IP) address and generating a respective transaction identifier based on the IP address for each signaling message, wherein the transaction identifier includes a numerical value corresponding to a sequential ordering of transaction identifiers generated by the sub-network processor.

6. A sub-network comprising:
   at least one sub-network processor for generating signaling messages, said at least one sub-network processor having associated therewith an internet protocol (IP) address and generating a respective transaction identifier based on the IP address for each signaling message; and
   a gateway communicating the signaling message to a signaling network, wherein the signaling message prompts a response message from said signaling network; and wherein said gateway routes the response message from said signaling network to the sub-network processor that generated the signaling message prompting the response message, the routing being based on the transaction identifier generated for the signaling message.

7. A sub-network for connection to a signaling network and comprising: a gateway and a plurality of sub-network processors connected thereto for generating signaling messages between each of the plurality of sub-network processors and the signaling network; each of the plurality of sub-network processors having associated therewith an Internet protocol (IP) address and generating a respective transaction identifier for each signaling message based on the IP address; said gateway communicating the signaling message to the signaling network, wherein the IP address comprises a sub-network address portion and a host address portion, and wherein the sub-network address portion corresponds to said plurality of sub-network processors and wherein the host address portion corresponds to the sub-network processor generating the respective transaction identifier.

8. A sub-network according to claim 7 wherein each of the plurality of sub-network processors generates the respective transaction identifier for each signaling message by separating the sub-network address portion and the host address portion and using only the host address portion.

9. A sub-network for connection to a signaling network and comprising: a gateway and a plurality of sub-network processors connected thereto for generating signaling messages between each of the plurality of sub-network processors and the signaling network; each of the plurality of sub-network processors having associated therewith an Internet protocol (IP) address and generating a respective transaction identifier for each signaling message based on the IP address; said gateway communicating the signaling message to the signaling network, wherein the IP address comprises a sub-network address portion and a host address portion, and wherein the sub-network address portion corresponds to said plurality of sub-network processors and wherein the host address portion corresponds to the sub-network processor generating the respective transaction identifier, and wherein the transaction identifier includes a nonrandomly generated numerical value.

10. A sub-network according to claim 8 wherein a signaling message prompts a response message from said signaling network; and wherein said gateway routes a response message from the signaling network to the sub-network processor that generated the signaling message, the routing being based on the respective_transaction identifier generated for the signaling message and comprising the gateway concatenating the sub-network address portion of the IP address and the host address portion used in the respective_transaction identifier.

11. A method of communicating signaling messages between a signaling network and a plurality of sub-network processors, each sub-network processor connected to the signaling network via a gateway and having an internet protocol (IP) address, the method comprising: generating a transaction identifier for a respective signaling message generated by a sub-network processor and communicated from the sub-network processor to the signaling network via the gateway, the transaction identifier being based on the IP address of the sub-network processor wherein the IP address comprises a sub-network address portion and a host address portion, and wherein the sub-network address portion corresponds to the plurality of sub-network processors and wherein the host address portion corresponds to the sub-network processor generating the respective signaling message.

12. A method of communicating signaling messages between a signaling network and a plurality of sub-network processors, each sub-network processor connected to the signaling network via a gateway and having an internet protocol IP address, the method comprising:
   generating a transaction identifier for an initial signaling message generated by a sub-network processor; and
   routing the initial signaling message from the sub-network processor to the signaling network via the gateway, the transaction identifier being based on the IP address of the sub-network processor, wherein the IP address comprises a sub-network address portion and a host address portion, and wherein the sub-network address portion corresponds to the plurality of sub-network processors and wherein the host address portion corresponds to the sub-network processor generating the initial signaling message, and wherein generating the transaction identifier for a the initial signaling message generated by a sub-network processor comprises separating the sub-network address portion and the host address portion of the IP address and using only the host address portion in the transaction identifier.

13. A method according to claim 12 wherein at least one response signaling message responding to the initial signaling message is received by the sub-network processor.

14. A method according to claim 13 further comprising reconstructing the IP address by concatenating the host address portion used in the transaction identifier and the sub-network address portion of the IP address; and routing the at least one response signaling message to the sub-network processor, the routing being based on the reconstructed IP address.

* * * * *

UNITED STATES PATENT AND TRADEMARK OFFICE
CERTIFICATE OF CORRECTION

PATENT NO. : 7,315,555 B2 Page 1 of 1
APPLICATION NO. : 10/161532
DATED : January 1, 2008
INVENTOR(S) : Cyr et al.

It is certified that error appears in the above-identified patent and that said Letters Patent is hereby corrected as shown below:

In the claims, column 8, line 30, delete "__" and insert -- - --.

In the claims, column 8, line 34, delete "__" and insert -- - --.

Signed and Sealed this

Second Day of September, 2008

JON W. DUDAS
*Director of the United States Patent and Trademark Office*